Sept. 13, 1932.                J. M. FOX                1,876,658
          FRICTION COUPLING FOR DRIVING NUTS AND THE LIKE
                      Filed March 22, 1930
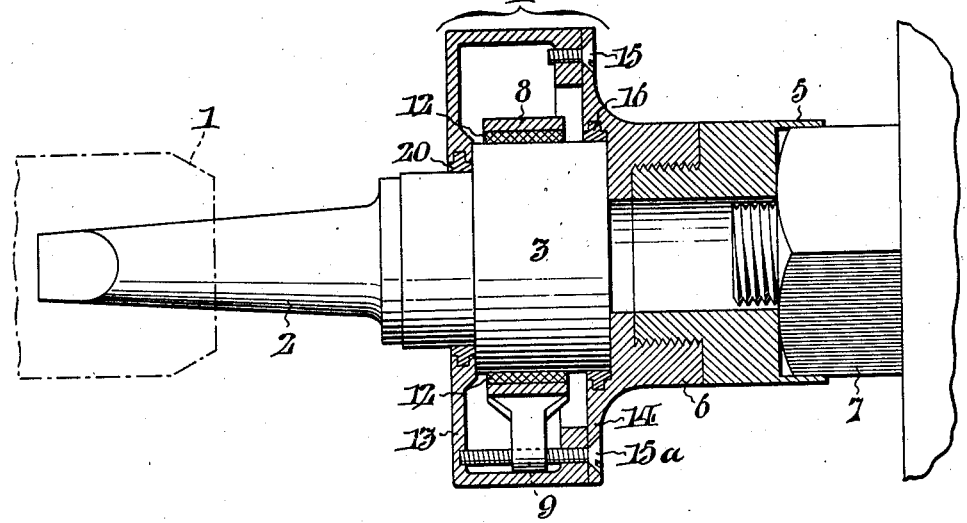
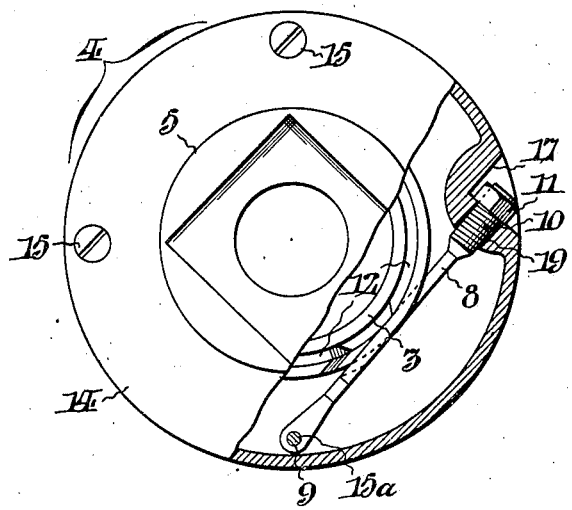
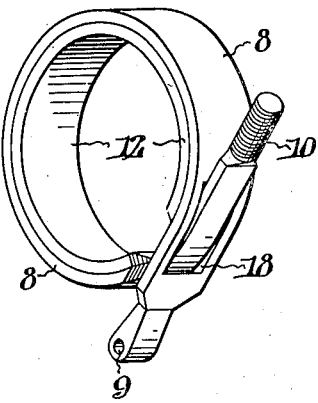
WITNESSES                                    INVENTOR:
                                          Joseph M. Fox,
                                       BY
                                              ATTORNEYS.

Patented Sept. 13, 1932

1,876,658

UNITED STATES PATENT OFFICE

JOSEPH M. FOX, OF CLEVELAND, OHIO

FRICTION COUPLING FOR DRIVING NUTS AND THE LIKE

Application filed March 22, 1930. Serial No. 438,020.

My invention while relating generally to friction couplings for driving nuts, screws, and the like, has particular application to couplings used for tightening nuts on railway track bolts.

One object of my invention is to provide a device adapted to be power driven and comprising a minimum of parts of simple construction which will handily and efficiently perform the work intended.

A further object of the invention is to provide in a device of this type, means for adjustment of the tension between a drum and friction band, the tension varying force being applied in a direction tangential to the face of the drum and uniformly over its surface in order that there shall be no tendency to pull the drum off center.

Other objects and advantages of the invention will be apparent from the description which follows, wherein I have described one embodiment of the invention with reference to accompanying drawing thereof. Of the drawing:

Fig. I is a side view, partly in section, of my novel friction coupling showing its application to the nut of a railway track bolt.

Fig. II is an end view of the same with a part of the clutch casing broken away; and Fig. III is a perspective view of the friction band of my coupling.

A portion of the driving mechanism is diagrammatically represented at 1 engaging a tapered shaft 2. The form of connection between the driving mechanism and the shaft 2 is not material to the invention, and the particular connection shown is one commonly used for power driven tools. Attached to the tapered shaft 2, and comprising with it the driving element of the friction coupling, is a drum 3. The driven element includes an annular casing 4 surrounding the drum 3 and a socket 5 axially aligned with and secured to the casing 4 by a threaded projection 6. The socket 5 is adapted to engage a nut 7 and may be interchanged with other sockets to accommodate nuts or bolts of varying sizes.

The drum 3 carries a friction band 8, one end of which is expanded and transversely perforated at 9, this end serving as a fixed anchorage and the other end of which is fashioned to the form of a screw 10 engaged by an adjusting nut 11 in a notched recess 17 at the exterior of the casing 4 adjacent to an opening 19 therethrough. The band 8 is preferably lined with brake lining 12 which substantially surrounds the face of the drum 3. This lining 12 engages the drum 3 to form a non-positive coupling between the driving and driven elements of the coupling. The band 8 is slotted at 18 and is turned upon itself with its screw end 10 projecting through the slot 18 so that the band 8 completely surrounds the drum 3. Accordingly the ends of the band 8 are disposed in a plane tangential to the face of the drum 3 at a common point. By turning the nut 11 the screw end 10 of the band 8 may be drawn toward the casing 4 and the tension between the drum 3 and band 8 increased. By turning the nut 11 in an opposite direction the tension may obviously be decreased. In either case the friction between band 8 and drum 3 is uniformly varied over the surface of the drum, and the tightening force is applied in a direction tangential to the face of the drum, so that there is no tendency to pull the drum off center. For this purpose the opening 19 through which the threaded end 10 of the band 8 passes to the outside of the casing is disposed with its axis passing through the center of the fixed anchorage 9.

The casing 4 is preferably constructed of two parts 13 and 14 secured by bolts 15 and 15a, the part 14 providing an annular bearing at 16 and the part 13 providing a similar bearing at 20 for the drum 3. Either a solid or roller bearing may be used for this purpose. It will be noted that the part 14 is in the form of a plate bolted at its circumferential margins to the part 13. One bolt 15a is considerably longer than the others 15 and passes entirely through the part 13 to the opposite side thereof. This bolt 15a serves as the fixed anchorage for the band 8.

The operation of the coupling in driving nuts will be apparent from the description. By adjustment of the friction band 8 through turning the adjusting nut 11, relative rotation between the positively driven drum 3 and the socket 5 is permitted after the nut 7 has been tightened to a point where a predetermined resistance is offered to further rotation. Accordingly the friction coupling may be adjusted in advance, having regard for the degree of tightness to which track bolts, for example, are to be turned, and having regard for the torque applied at the driving element, so that at the proper point the resistance offered at the driven element will overcome the friction at the coupling. The coupling being non-positive, the parts of the coupling are protected against undue strain.

The device described, while comprising a comparatively small number of parts, is both durable and efficient. It may be easily disassembled by removal of part 14 from the casing 4, and new brake linings may be substituted as occasion demands. The simplicity and relatively light weight of the coupling renders it both practical in operation and inexpensive to manufacture.

While I have described in some detail a specific embodiment of the invention, it will be apparent to those skilled in the art that various changes may be made in the form of the device as described and illustrated without departing from the spirit of the invention as set forth in the appended claims.

Having thus described my invention, I claim:

1. A friction coupling comprising a driving element, a driven element, one of said elements having a drum thereon, a friction band attached to the other element, said band surrounding said drum and having its ends tangential thereto at a common point on its face, and means for varying the tension between said band and drum.

2. A friction coupling comprising a driving element, a driven element, one of said elements having a drum thereon and the other element including a casing, a friction band completely surrounding said drum and having its ends tangential to the drum at a common point on its face, one of said ends being attached to the casing, and the other of said ends terminating in a threaded portion, and means engaging said threaded portion for tightening said band around said drum.

3. A friction coupling comprising a driving element having a drum thereon, a driven element including a casing forming a bearing for said drum, a band adapted to engage said drum and having one end attached to said casing, means applied to the other end of said band for varying the tension between said band and drum, the ends of said band lying in a common plane tangential to the face of the drum.

4. A friction coupling comprising a driving element, a driven element, one of said elements having a drum thereon and the other element having a friction band attached thereto, said friction band having a slot therein and having its ends tangential to the face of the drum with one end passing through said slot, and means for tightening said band around said drum.

In testimony whereof, I have hereunto signed my name at Cleveland, Ohio, this 18th day of March, 1930.

JOSEPH M. FOX.